United States Patent
Todd (10) Patent No.: US 12,026,668 B2
(45) Date of Patent: Jul. 2, 2024

(54) INVENTORY MANAGEMENT LOADOUT SYSTEM

(71) Applicant: Eric Thane Todd, Salinas, CA (US)

(72) Inventor: Eric Thane Todd, Salinas, CA (US)

(*) Notice: Subject to any disclaimer, the term of this patent is extended or adjusted under 35 U.S.C. 154(b) by 273 days.

(21) Appl. No.: 17/376,970

(22) Filed: Jul. 15, 2021

(65) Prior Publication Data

US 2022/0019969 A1    Jan. 20, 2022

Related U.S. Application Data (60) Provisional application No. 63/052,352, filed on Jul. 15, 2020.

(51) Int. Cl.
| | | |
|---|---|---|
| *G06Q 10/0875* | (2023.01) | |
| *B65G 1/137* | (2006.01) | |
| *G06Q 20/00* | (2012.01) | |

(52) U.S. Cl.
CPC ....... *G06Q 10/0875* (2013.01); *B65G 1/1371* (2013.01); *B65G 1/1373* (2013.01)

(58) Field of Classification Search
CPC .............. G06Q 10/0875; B65G 1/1371; B65G 1/1373; B65G 1/0492; B65G 2201/0258; B65G 1/0485; B65G 29/02; B65G 47/5136
USPC ......................................................... 705/29
See application file for complete search history.

(56) References Cited

U.S. PATENT DOCUMENTS

| | | | |
|---|---|---|---|
| 7,097,045 B2 | 8/2006 | Winkler | |
| 8,037,994 B2 | 10/2011 | Schaefer | |
| 8,397,898 B2 | 3/2013 | Buchmann | |
| 9,026,243 B2* | 5/2015 | Radwallner | B65G 1/1378 700/214 |
| 11,537,982 B1* | 12/2022 | Mehta | G06Q 10/087 |
| 2017/0032310 A1* | 2/2017 | Mimnaugh | G06F 40/174 |

OTHER PUBLICATIONS

PRK Vertical carousel system, https://www.youtube.com/watch?v=zedWwjg8CzE.

* cited by examiner

*Primary Examiner* — Garcia Ade (57) ABSTRACT

An inventory management loadout system is a system that expedites the delivery of products in a warehouse or distribution center by simplifying the loading process. The system may include a support platform, a support wheel, a wheel frame, a plurality of tubular shelves, an inbound conveyor system, and an outbound conveyor system. The support platform supports the operation of the system. The support wheel enables the temporary storing of the products so that the products are ready to be loaded onto the corresponding truck. The wheel frame supports the load from the support wheel and enables the rotation of the support wheel. The plurality of tubular shelves facilitates the vertical storage of the products to prevent bottlenecking. The inbound conveyor system enables the loading of the products to the plurality of tubular shelves. The outbound conveyor system facilitates the unloading of the products from the plurality of tubular shelves.

16 Claims, 12 Drawing Sheets

INVENTORY MANAGEMENT LOADOUT SYSTEM

The current application claims a priority to the U.S. provisional patent application Ser. No. 63/052,352 filed on Jul. 15, 2020.

FIELD OF THE INVENTION

The present invention relates to supply chain systems. More specifically, the present invention provides an inventory management loadout system that improves the handling and the processing of merchandise for shipment.

BACKGROUND OF THE INVENTION

Existing techniques for loading out orders on semi-trucks and trailers in a warehouse or distribution center are deficient in several aspects. For instance, current technologies are slow and cumbersome, often creating a bottleneck that affects the overall process of the supply chain. Furthermore, current technologies lead to high truck wait time while waiting for the products to be loaded. For example, many trucks wait an hour or more for loading at the loading bay, which leads to a further decrease in supply chain efficiency. As a result, the company may have trouble meeting the just-in-time inventory needs of different customers, which in turn may negatively impact sales of the customers.

Moreover, current systems utilized in warehouses and distribution centers are slow to move the product, which can result in some of the products being negatively affected due to the storage requirements of the products. For example, produce can spoil when seating on a warm environment for too long as most produce needs to be stored in the right environment to maintain its freshness. In addition, since the delivery process can be delayed, some of the products need to be re-stocked. Therefore, there is a need for a new loadout system that overcomes the problems of the current systems.

An objective of the present invention is to provide a system that facilitates the loading of products inside a warehouse or distribution center to expedite the shipping and delivery of the products. Another objective of the present invention is to provide a system that prevents bottlenecks in the loading process by facilitating the sorting and storage of the products near the loading area. Another objective of the present invention is to provide a system that prevents the spoiling of products during the loading process while also reducing storage and restocking costs. Another objective of the present invention is to provide a system that enables the semi-automation of the loading process to increase the efficiency of the supply chain. Another objective of the present invention is to provide a system that can be retrofit to existing buildings or can be custom built in new buildings. Additional features and benefits are further discussed in the sections below.

SUMMARY OF THE INVENTION

According to some embodiments, an inventory management loadout system is disclosed. The system of the present invention facilitates the loading of products onto the corresponding truck for delivery by temporarily storing the products close to the loading area for fast and convenient loading. The present invention prevents products from crowding around the loading area to prevent bottlenecks which reduces the efficiency of the supply chain. The present invention utilizes a wheel assembly that vertically stores products near the loading area to maintain the products ready to be loaded onto the corresponding truck. The wheel assembly, in conjunction with a conveyor system, facilitates the movement of product from inside a warehouse or distribution center to the loading area for quick loading. This reduces the amount of time the trucks must wait during the loading process and expedites the delivery of the products to their corresponding destination.

The present invention further decreases the cold room space constraints, decrease chances of heat energy gain, decrease chances of poor-quality product, and decrease restocking costs which in turn reduces overall operational costs. The present invention enables trucks to back in and load out in half an hour or less, enabling the product to leave the facility in a timely manner. This increases sales due to happy customers that equate into repeat buyers. More sales ensure that the business will do better than break-even with an increased cash flow. Furthermore, the present invention shrinks supply chain time and help retailers with just-in-time inventory needs meet their requirements.

DETAIL DESCRIPTIONS OF THE INVENTION

All illustrations of the drawings are for the purpose of describing selected versions of the present invention and are not intended to limit the scope of the present invention.

Figure 1:
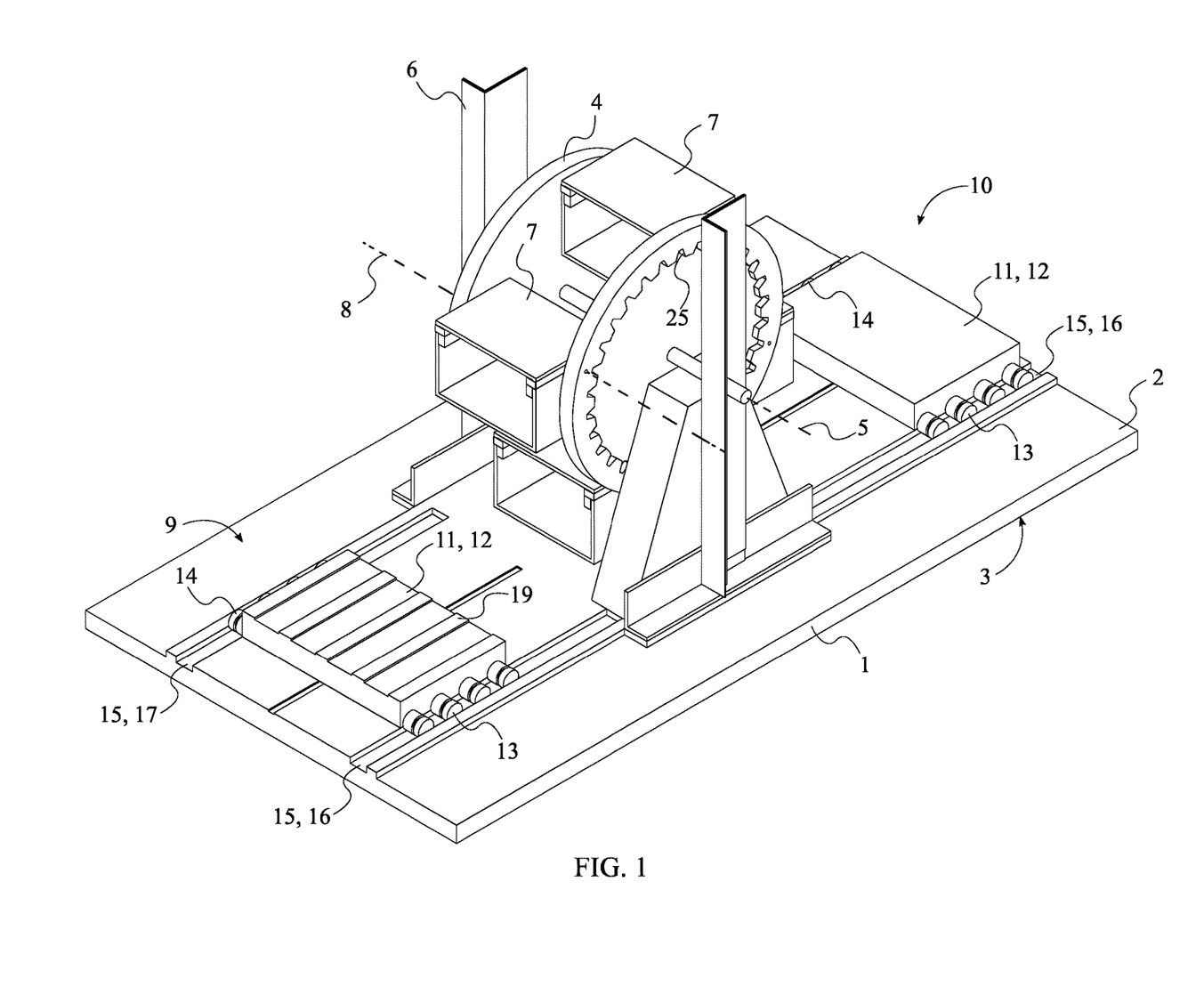
FIG. 1 is a top perspective view showing the present invention.
Figure 2:
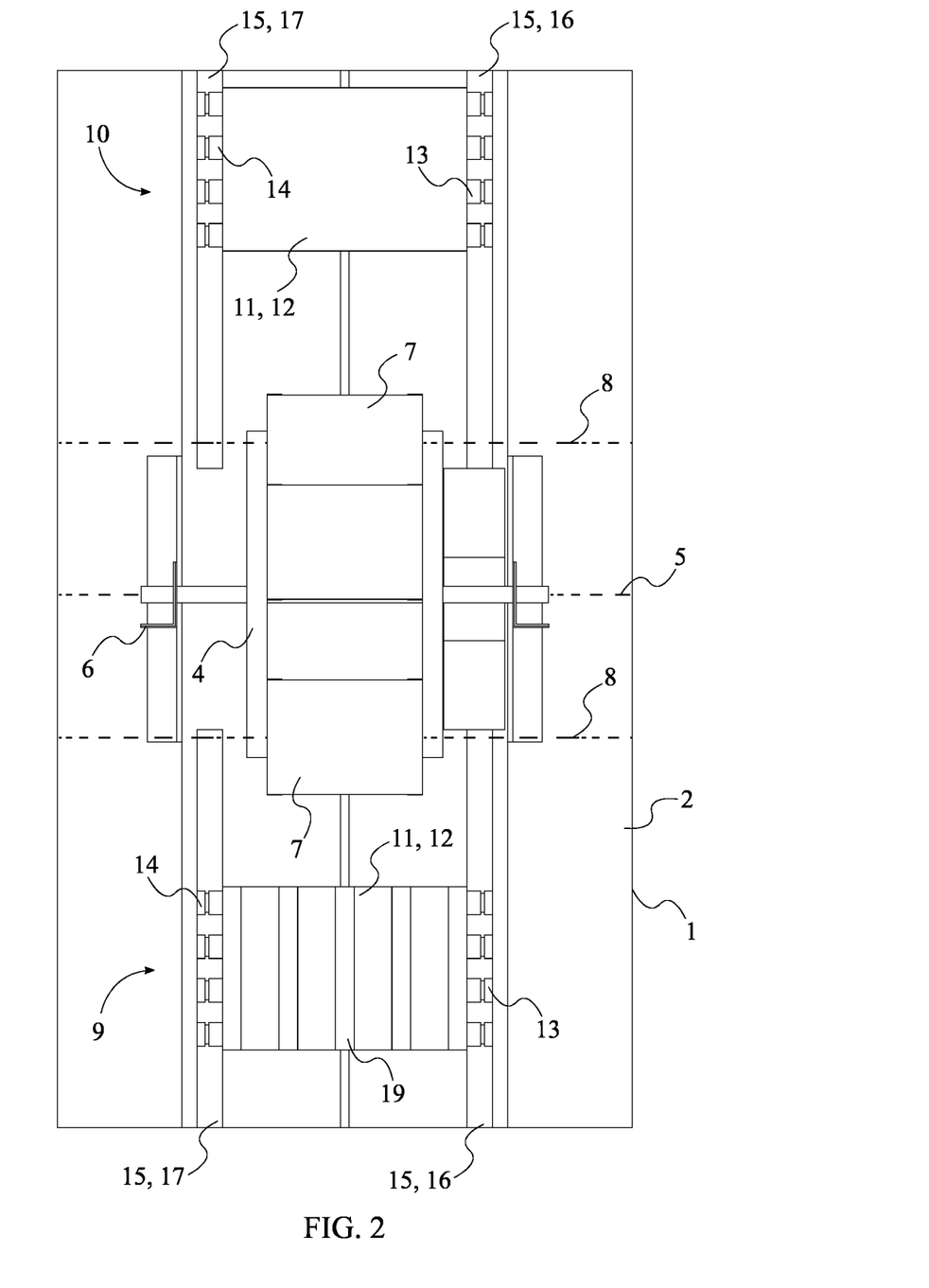
FIG. 2 is a top plan view showing the present invention.
Figure 3:
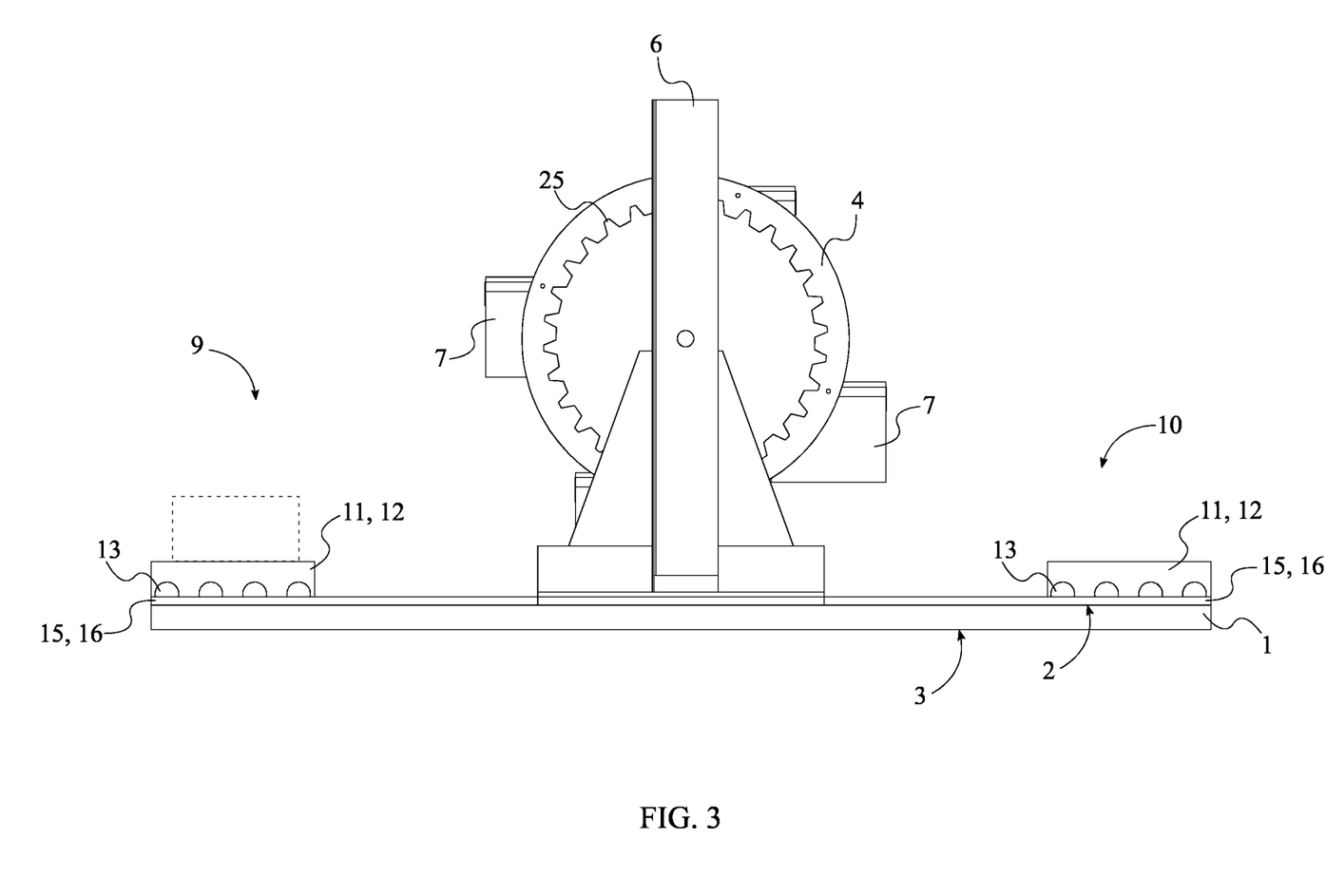
FIG. 3 is a side view showing the present invention, wherein the conveyor shuttle of the inbound conveyor system is shown carrying a load.
Figure 4:
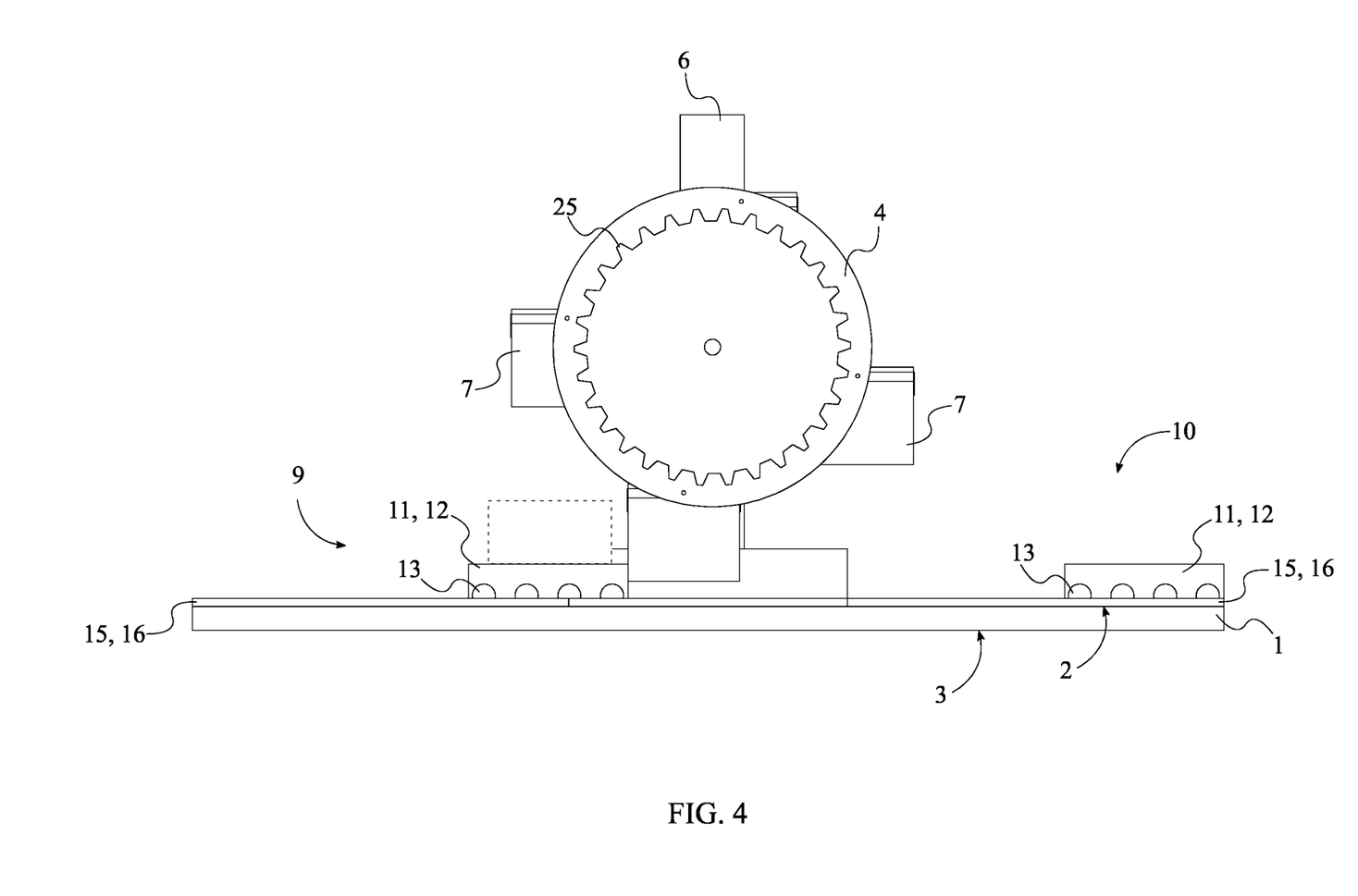
FIG. 4 is a side view showing the present invention, wherein the conveyor shuttle of the inbound conveyor system is shown positioned adjacent to a tubular shelf to transfer the load from the conveyor shuttle to the tubular shelf.
Figure 5:
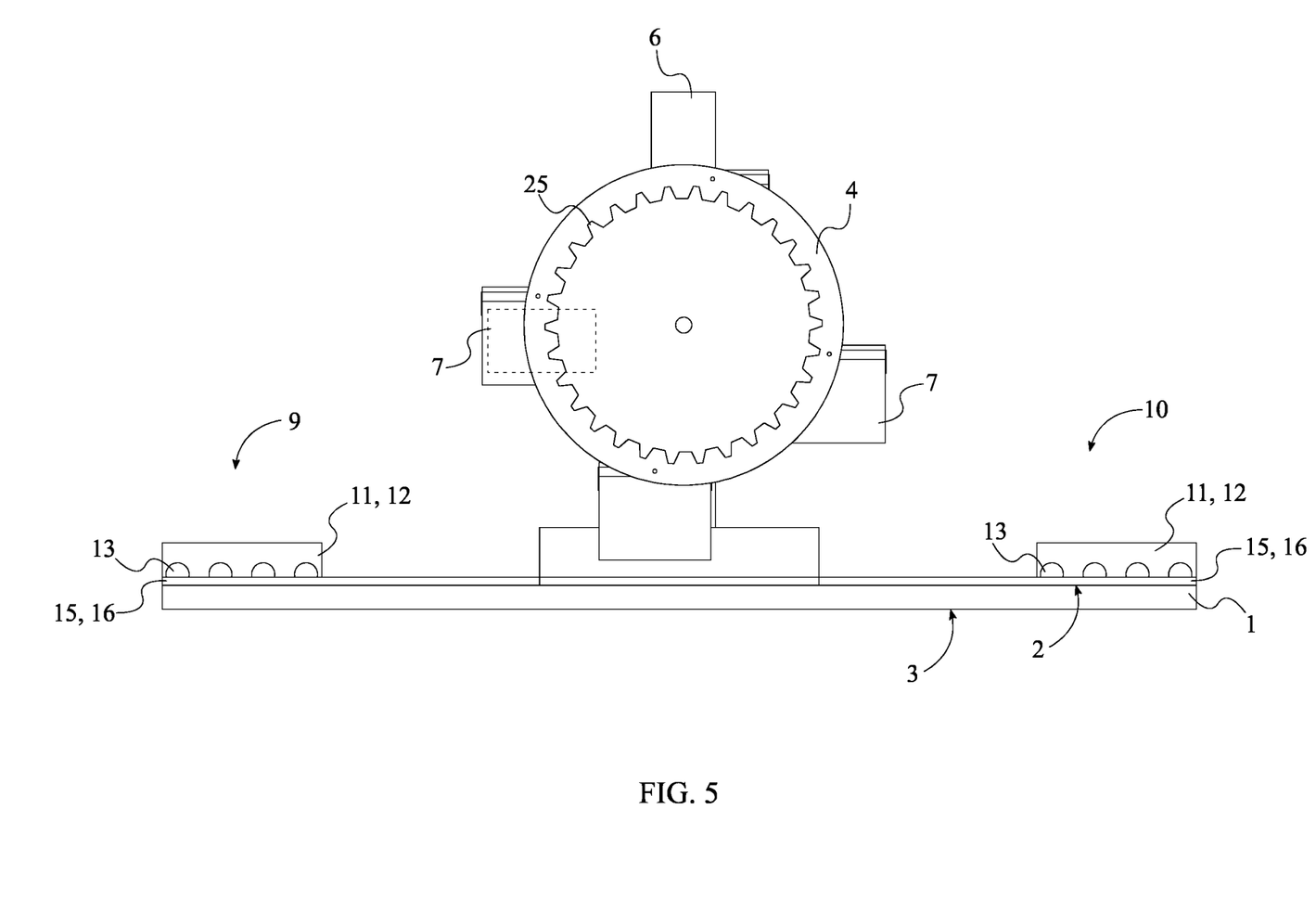
FIG. 5 is a side view showing the present invention, wherein the support wheel is shown rotated to temporarily store away the load.
Figure 6:
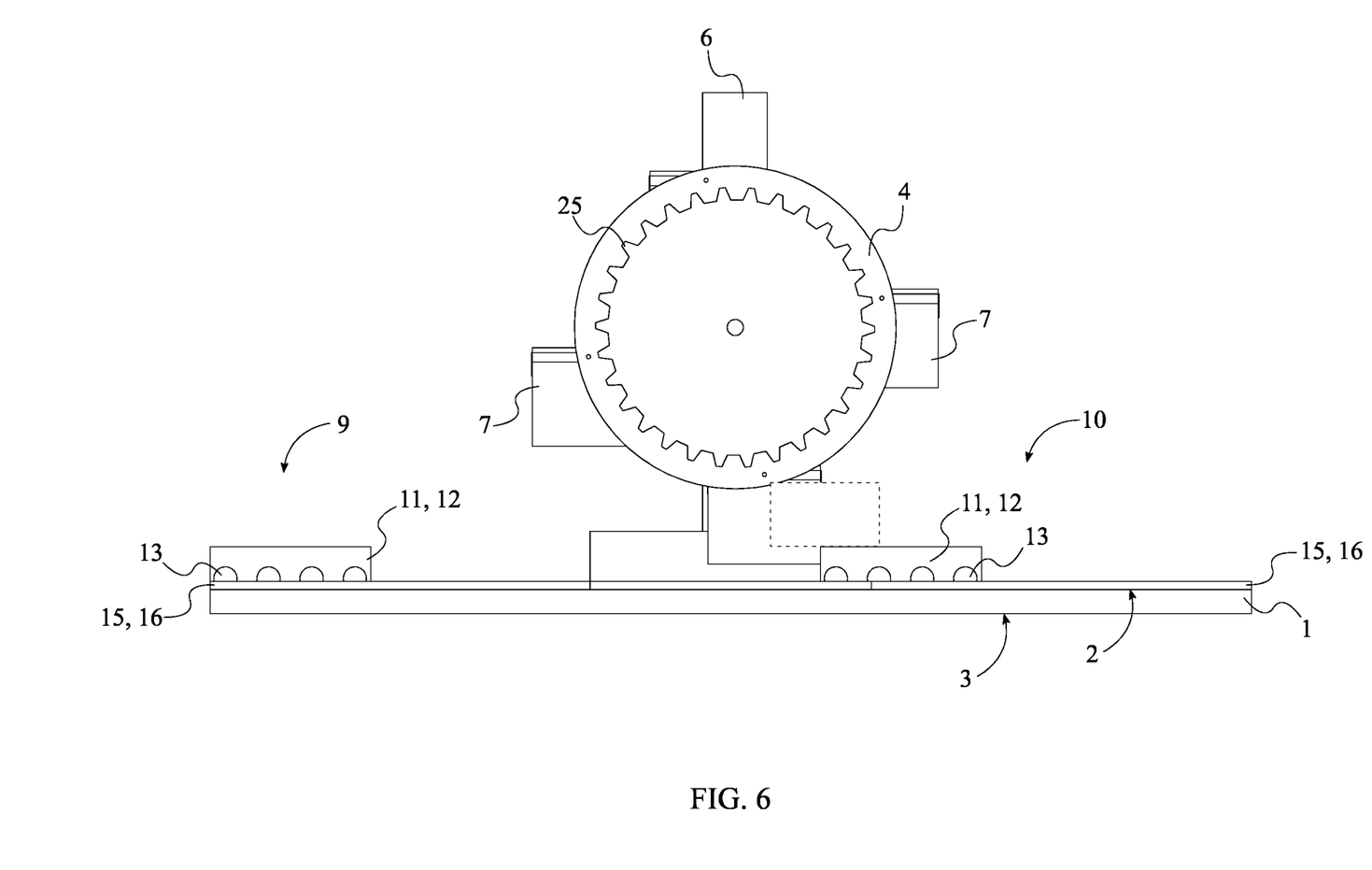
FIG. 6 is a side view showing the present invention, wherein the conveyor shuttle of the outbound conveyor system is shown positioned adjacent to a tubular shelf to transfer the load from the tubular shelf to the conveyor shuttle.
Figure 7:
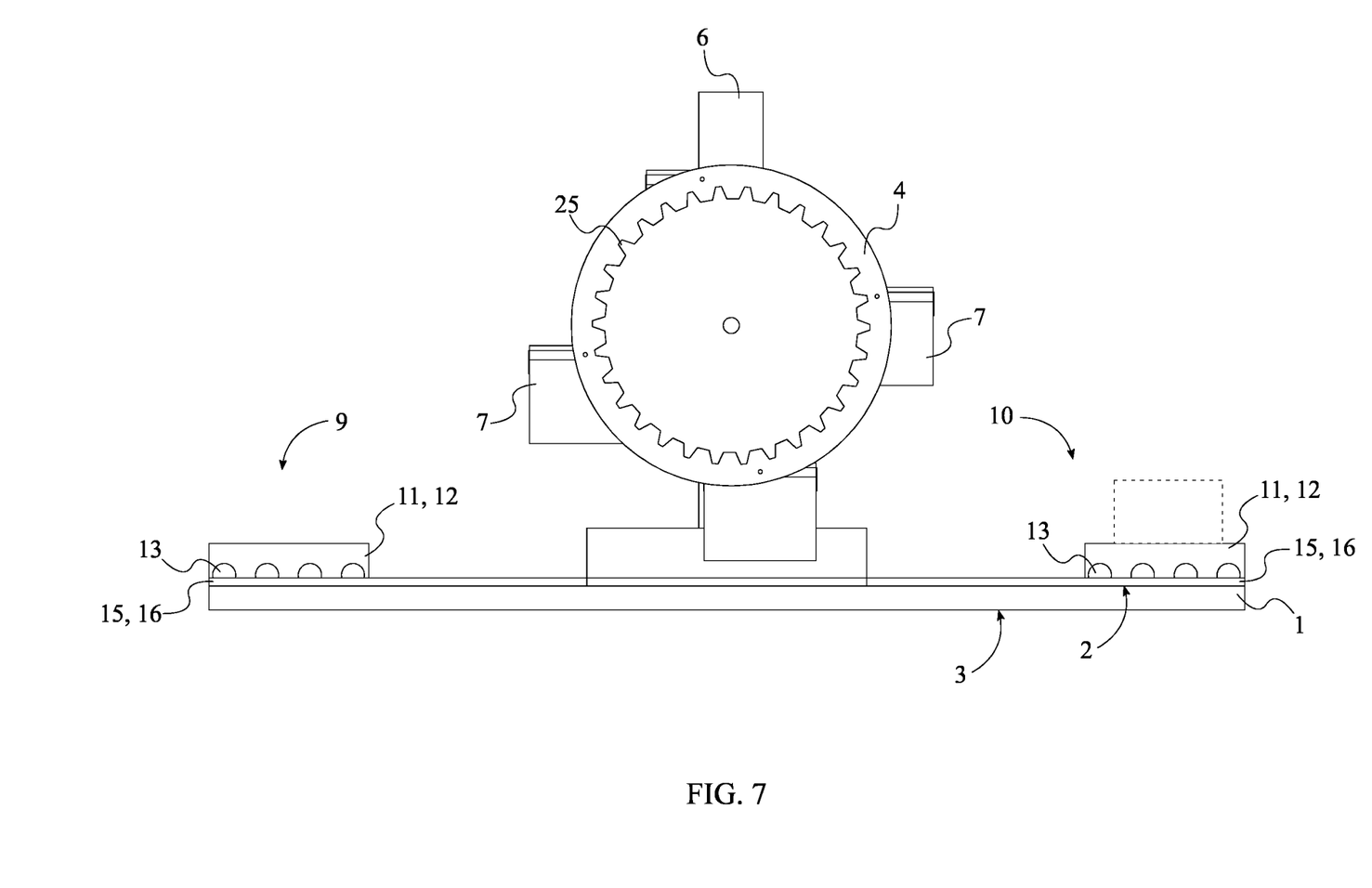
FIG. 7 is a side view showing the present invention, wherein the conveyor shuttle of the outbound conveyor system is shown carrying the load away from the support wheel.

The present invention is an inventory management load-out system that expedites the loading process of products in a warehouse or distribution center by preventing bottlenecks in the loading area without negatively affecting the condition of the products. As can be seen in FIG. 1 through 3, the present invention may comprise a support platform 1, a support wheel 4, a wheel frame 6, a plurality of tubular shelves 7, an inbound conveyor system 9, and an outbound conveyor system 10. The support platform 1 enables the installation of the present invention in existing buildings while also supporting the operation of the system. The support wheel 4 enables the temporary storing and sorting of the products near the loading area so that the products are ready to be loaded onto the corresponding truck. The wheel frame 6 supports the load from the support wheel 4 while enabling the rotation of the support wheel 4. The plurality of tubular shelves 7 facilitates the temporary vertical storage of the products adjacent to the loading area to prevent bottlenecking. The inbound conveyor system 9 enables the loading of the products to the plurality of tubular shelves 7. The outbound conveyor system 10 facilitates the unloading of the products from the plurality of tubular shelves 7 to the corresponding truck.

The general configuration of aforementioned components enables the expedited loading of products to trucks for quick shipping and delivery of the products to increase the efficiency of the supply chain. As can be seen in FIG. 1 through 3, the support platform 1 is designed to enable the loading and unloading of the products to/from the plurality of tubular shelves 7 on the support wheel 4. The support platform 1 is an elongated flat structure that comprises a first platform face 2 and a second platform face 3 corresponding to the large flat surfaces of the support platform 1. The support wheel 4 is a large wheel structure that preferably has a radius of thirteen feet and a half of an inch. The support wheel 4 is rotatably mounted onto the first platform face 2 by the wheel frame 6. This maintains the support wheel 4 elevated above the ground so that the support wheel 4 can freely rotate. A wheel rotation axis 5 of the support wheel 4 is positioned parallel to the support platform 1 so that the support wheel 4 does not collide with the support platform 1 as the support wheel 4 rotates. The plurality of tubular shelves 7 is radially distributed about the support wheel 4 to retain different products ready to be loaded onto a truck. A sleeve central axis 8 of each of the plurality of tubular shelves 7 is positioned perpendicular to the wheel rotation axis 5 so that the loading and unloading of the products to/from the plurality of tubular shelves 7 is not obstructed by the support wheel 4. The sleeve central axis 8 of the each of the plurality of tubular shelves 7 is also positioned parallel to the support platform 1 so that the plurality of tubular shelves 7 remains straight around the support wheel 4 and the retained products do not fall off. Further, the inbound conveyor system 9 and the outbound conveyor system 10 are mounted onto the first platform face 2 to move products to/from each of the plurality of tubular shelves 7. The inbound conveyor system 9, the support wheel 4, and the outbound conveyor system 10 are also serially positioned to each other to maintain an unobstructed flow of products throughout the system.

Figure 10:
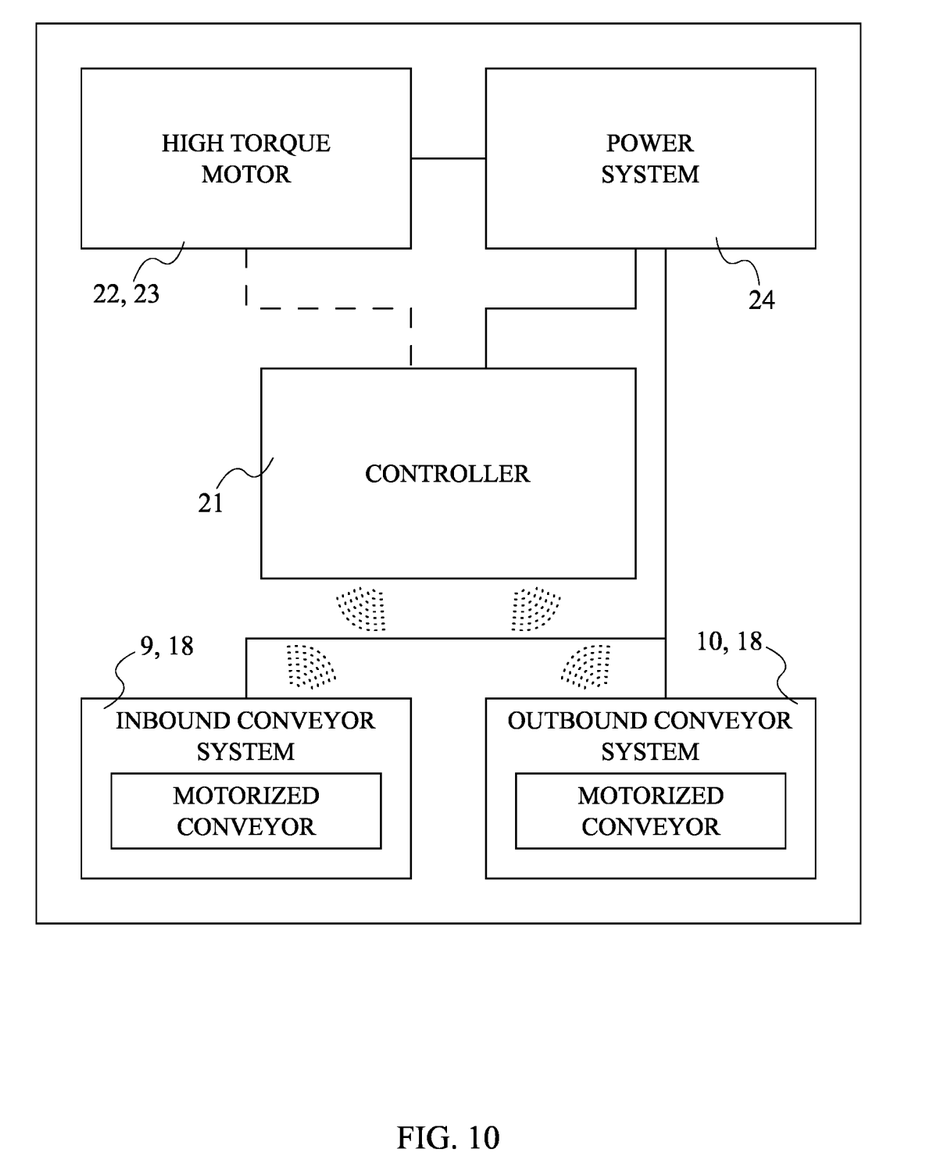
FIG. 10 is a schematic view showing the electronic connections, the electrical connections, and wireless connections of the present invention, wherein the electronic connections are shown as dashed path lines, wherein the electrical connections are shown as solid path lines, and wherein the wireless connections are shown as dotted path lines.

To enable the automated or semiautomated operation of the system, the present invention may further comprise a controller 21, a motor 22, and a power system 24, as can be seen in FIG. 10. The controller 21 facilitates the configuration of the system to operate under predetermined settings. The motor 22 enables the motorized operation of the support wheel 4. According to the torque requirement of the system, the motor 22 can be multiple motors that work in conjunction to be able to provide the torque necessary to rotate the support wheel 4. The support wheel 4 is preferably rotated one and quarter of revolutions per hour. Further, the power system 24 provides the voltage necessary for the operation of the controller 21 and the motor 22. The controller 21 and the power system 24 are mounted offset to the wheel frame 6 to facilitate the access to each for maintenance and operation. The controller 21 is electronically connected to the motor 22 so that the controller 21 regulates the operation of the motor 22. The power system 24 is electrically connected to the controller 21 and the motor 22 to provide the appropriate voltage to each. Further, the motor 22 is operatively coupled to the support wheel 4, wherein the motor 22 is used to rotate the support wheel 4. For example, the motor 22 can be coupled to the main axle of the support wheel 4 to provide the torque necessary to rotate the support wheel 4 a desired number of revolutions.

Figure 8:
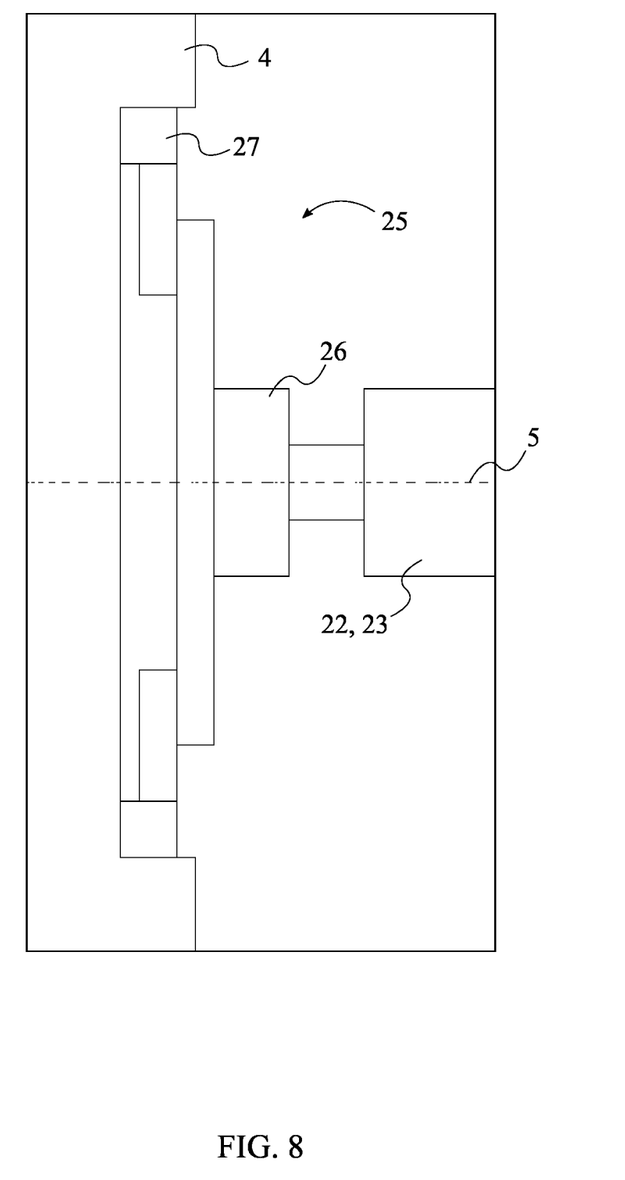
FIG. 8 is a schematic view showing the epicyclic gear train being connected to the support wheel.

The present invention can utilize different technologies to facilitate the controlled rotation of the support wheel 4 depending on the requirements of the system. In one embodiment, the present invention can utilize a gear system to enable the controlled rotation of the support wheel 4. As can be seen in FIGS. 8 and 10, the present invention may further comprise an epicyclic gear train 25 to efficiently transfer the torque from the motor 22 to the support wheel 4. Also, the motor 22 is a high torque motor 23. The high torque motor 23 can be a low-speed high torque motor to facilitate the controlled rotation of the support wheel 4. However, other types of motors can be utilized that can provide high torque in a controlled manner. The epicyclic gear train 25 comprises a train input 26 and a train output 27 to transfer the torque from the high torque motor 23 to the support wheel 4. The high torque motor 23 is operatively coupled to the train input 26, wherein the high torque motor 23 is used to rotate the train input 26. For example, the train input 26 can utilize a gear connector or similar joint that facilitates the torque transfer from the high torque motor 23 to the epicyclic gear train 25. The train output 27 is torsionally mounted to the support wheel 4 to transfer the torque from the epicyclic gear train 25 to the support wheel 4. In addition, the epicyclic gear train 25 can be used to decelerate the rotation of the support wheel 4 to control the position of each of the plurality of tubular shelves 7. A brake mechanism can be operatively coupled to the epicyclic gear train 25 to decelerate the rotation of the epicyclic gear train 25, which in turn decelerates the rotation of the support wheel 4 to enable the controlled rotation of the support wheel 4.

Figure 9:
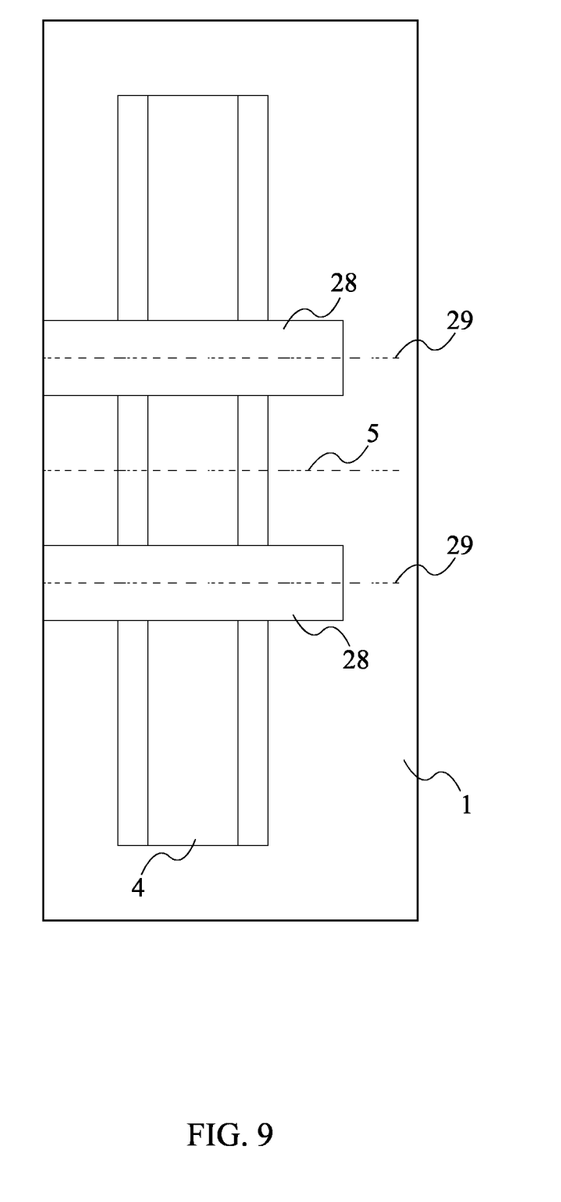
FIG. 9 is a schematic view showing the at least one drive roller within the support platform, wherein the support wheel is shown in frictional contact with the at least one drive roller.

In another embodiment, the present invention can utilize a roller system in the support platform 1 to rotate the support wheel 4 in a controller 21 manner. As can be seen in FIGS. 9 and 10, the present invention may further comprise at least one drive roller 28. The at least one drive roller 28 serves to transfer the torque from the high torque motor 23 to the support wheel 4. The at least one drive roller 28 is rotatably mounted into the support platform 1 from the first platform surface so that the at least one drive roller 28 can be in contact with the support wheel 4. A roller rotation axis 29 of the at least one drive roller 28 is positioned parallel to the wheel rotation axis 5 so that rotation of the support wheel 4 is aligned with the rotation of the at least one drive roller 28. The high torque motor 23 is also operatively coupled to the at least one drive roller 28, wherein the high torque motor 23 is used to rotate the at least one drive roller 28. For example, the high torque motor 23 can be mounted within the support platform 1 and connected to the axle of the at least one drive roller 28 to transfer the torque generated by the high torque motor 23 to the at least one drive roller 28. The at least one drive roller 28 is also frictionally pressed against the support wheel 4 to transfer the torque from the at least one drive roller 28 to the support wheel 4. Like the gear system, this embodiment can also utilize a brake mechanism to decelerate the rotation of the at least one drive roller 28, which in turn decelerates the rotation of the support wheel 4. In other embodiments, the present invention can utilize different motorized means to rotate the support wheel 4 in a controlled manner.

As previously discussed, the inbound conveyor system 9 and the outbound conveyor system 10 enable the transfer of products from the storage area to the support wheel 4 and from the support wheel 4 to the loading area, respectively. To do so, the inbound conveyor system 9 and the outbound conveyor system 10 may each comprise a conveyor shuttle 11 and a conveyor track 15. As can be seen in FIG. 3 through 7, the conveyor shuttle 11 serves as the transportation means to move the products along the support platform 1. The conveyor track 15 guides the movement of the conveyor shuttle 11 along the support platform 1 to ensure the conveyor shuttle 11 does not derail. So, the conveyor track 15 is positioned parallel to the support platform 1 to guide the conveyor shuttle 11. The conveyor track 15 is also mounted onto the first platform face 2 to keep the conveyor shuttle 11 in communication with the plurality of tubular shelves 7 mounted on the support wheel 4. Further, the conveyor shuttle 11 is movably mounted along the conveyor track 15 so that the conveyor shuttle 11 can freely move along the conveyor track 15.

Like the support wheel 4, the inbound conveyor system 9 and the outbound conveyor system 10 can operate in an automated or semiautomated manner. To do so, the inbound conveyor system 9 and the outbound conveyor system 10 each is a motorized conveyor system 18, as can be seen in FIG. 10. The motorized conveyor system 18 utilizes motorized means to move the conveyor shuttle 11 along the conveyor track 15 in a predetermined motion. For example, the conveyor shuttle 11 can be a motorized shuttle with integrated motorized means to move the conveyor shuttle 11 along the conveyor track 15. Alternatively, the conveyor track 15 can include a motorized chain or pulley system that moves the conveyor shuttle 11 along the conveyor track 15. The controller 21 is communicably coupled to the motorized conveyor system 18 to transmit the commands that dictate the movement of the conveyor shuttle 11. The power system 24 is also electrically connected to the motorized conveyor system 18 to provide the voltage necessary for the operation of the motorized conveyor system 18.

To enable the motorized capabilities of the conveyor shuttle 11, the conveyor shuttle 11 may comprise a shuttle base 12, a series of first rollers 13, and a series of second rollers 14. As can be seen in FIG. 3 through 7, the shuttle base 12 corresponds to the flat structure of the conveyor shuttle 11 that receives the required number of products. The shuttle base 12 can be sized to receive at least eight pallets. Each pallet can be forty inches wide and forty-eight inches long. The shuttle base 12 is preferably fourteen feet and a quarter of an inch wide and eight feet and a quarter of an inch long. Each tubular shelf of the plurality of tubular shelves 7 is big enough to accommodate the eight pallets. Each tubular shelf is preferably fourteen feet and three quarters of an inch wide, eleven feet tall, and eight feet deep. The series of first rollers 13 and the series of second rollers 14 enable the movement of the shuttle base 12 along the conveyor track 15. Further, the conveyor track 15 may comprise a first track 16 and a second track 17 to accommodate the series of first rollers 13 and the series of second rollers 14, respectively. In addition, the series of first rollers 13 is rotatably mounted adjacent to the shuttle base 12. Similarly, the series of second rollers 14 is also rotatably mounted adjacent to the shuttle base 12, opposite the series of first rollers 13. This forms a wheeled structure that can move along the conveyor track 15. The first track 16 and the second track 17 are mounted parallel onto the first platform face 2 to guide the conveyor shuttle 11 along the support platform 1. The first track 16 and the second track 17 are also positioned parallel and offset to each other to guide the conveyor shuttle 11 in a straight line along the support platform 1. Further, the series of first rollers 13 is translationally engaged along the first track 16. Likewise, the series of second rollers 14 is translationally engaged along the second track 17. This enables the conveyor shuttle 11 to move along the conveyor track 15 without the conveyor shuttle 11 to derail from the conveyor track 15.

Furthermore, the inbound conveyor system 9 and the outbound conveyor system 10 can provide means to help stack products up on the conveyor shuttle 11. So, the inbound conveyor system 9 and the outbound conveyor system 10 may each further comprise at least one organizing feature 19. As can be seen in FIGS. 1 and 2, the at least one organizing feature 19 enables workers to stack products on top of the conveyor shuttle 11 so that the necessary number of products is stored in the appropriate tubular shelf of the plurality of tubular shelves 7. For example, the at least one organizing feature 19 can include multiple rails distributed on top of the conveyor shuttle 11 that match the design of storage pallets that can be transported using conventional forklifts. The rails are preferably spaced forty and half inches apart from each other. The at least one organizing feature 19 is mounted onto the conveyor shuttle 11 so that the workers can position the pallets on top of the conveyor shuttle 11. This also enables the products to be seamlessly transferred from the conveyor shuttle 11 of the inbound conveyor system 9 to the corresponding tubular shelf as well as from the tubular shelf to the conveyor shuttle 11 of the outbound conveyor system 10.

Figure 12:
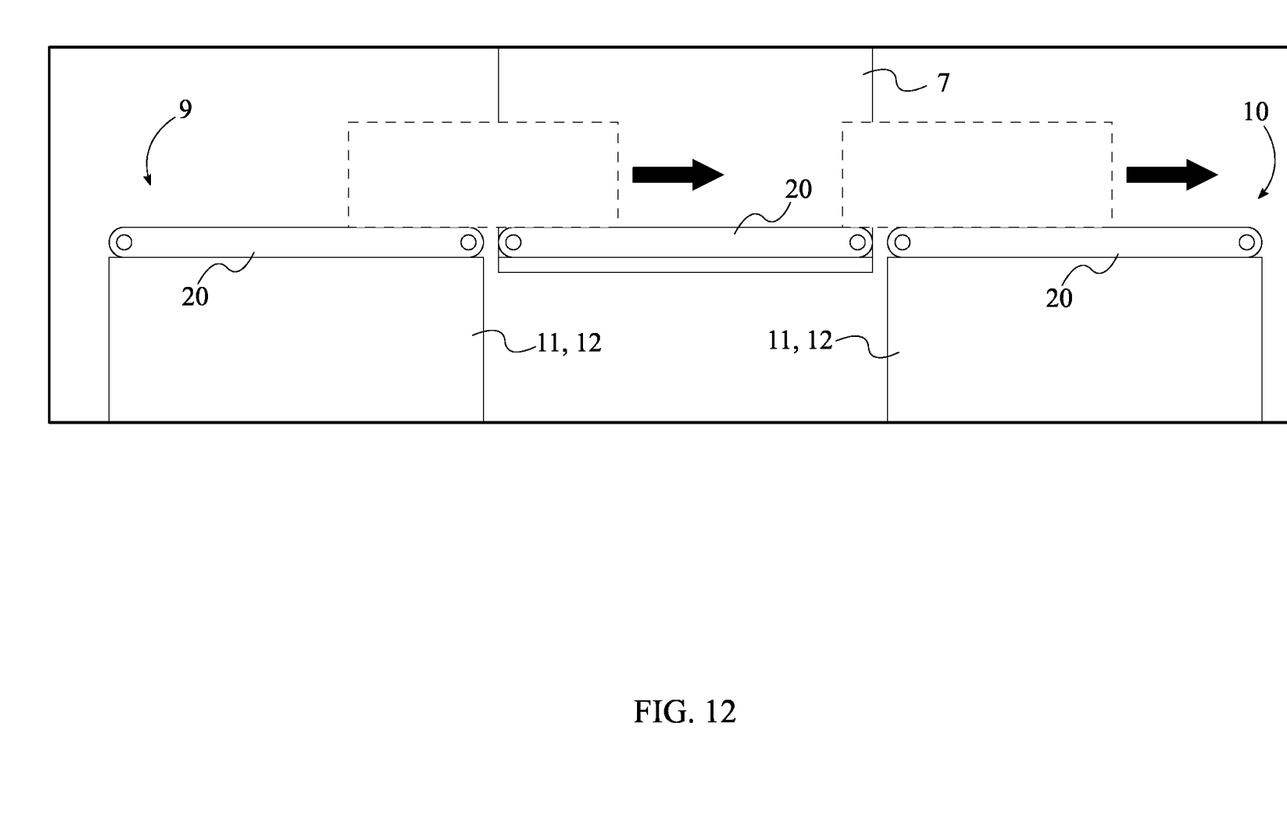
FIG. 12 is a schematic view showing the shelf transfer mechanism of the present invention, wherein the shelf transfer mechanism is shown installed on the conveyor shuttle of the inbound conveyor system, the conveyor shuttle of the outbound conveyor system, and the tubular shelf of the plurality of tubular shelves.

To facilitate the transfer of products between the conveyor shuttle 11 and a selected tubular shelf from the plurality of tubular shelves 7, the inbound conveyor system 9 and the outbound conveyor system 10 may each further comprise a shelf transfer mechanism 20. As can be seen in FIG. 12, the shelf transfer mechanism 20 enables the automated transfer of products between the conveyor shuttle 11 and a selected tubular shelf from the plurality of tubular shelves 7. The shelf transfer mechanism 20 is operatively mounted to the conveyor shuttle 11, wherein the shelf transfer mechanism 20 of the inbound conveyor system 9 is used to load items from the conveyor shuttle 11 of the inbound conveyor system 9 to a selected shelf from the plurality of tubular shelves 7, and wherein the shelf transfer mechanism 20 of the outbound conveyor system 10 is used to unload items from a selected tubular shelf from the plurality of tubular shelves 7 to the conveyor shuttle 11 of the outbound conveyor system 10. For example, the shelf transfer mechanism 20 can be a motorized telescopic platform mounted onto the shuttle base 12 that moves the products to the tubular shelf from the conveyor shuttle 11. The shelf transfer mechanism 20 can also resemble a forklift mechanism able to retrieve the products from the tubular shelf and position the products onto the shuttle base 12. Further, the shelf transfer mechanism 20 can be a chain drive system installed on the conveyor shuttle 11 and inside of each of the tubular shelf of the plurality of tubular shelves 7 to facilitate the transfer of products between the conveyor shuttle 11 and the tubular shelf. In other embodiments, the present invention can utilize other mechanisms to facilitate the transfer of products between the conveyor shuttle 11 and a selected tubular shelf from the plurality of tubular shelves 7.

Figure 11:
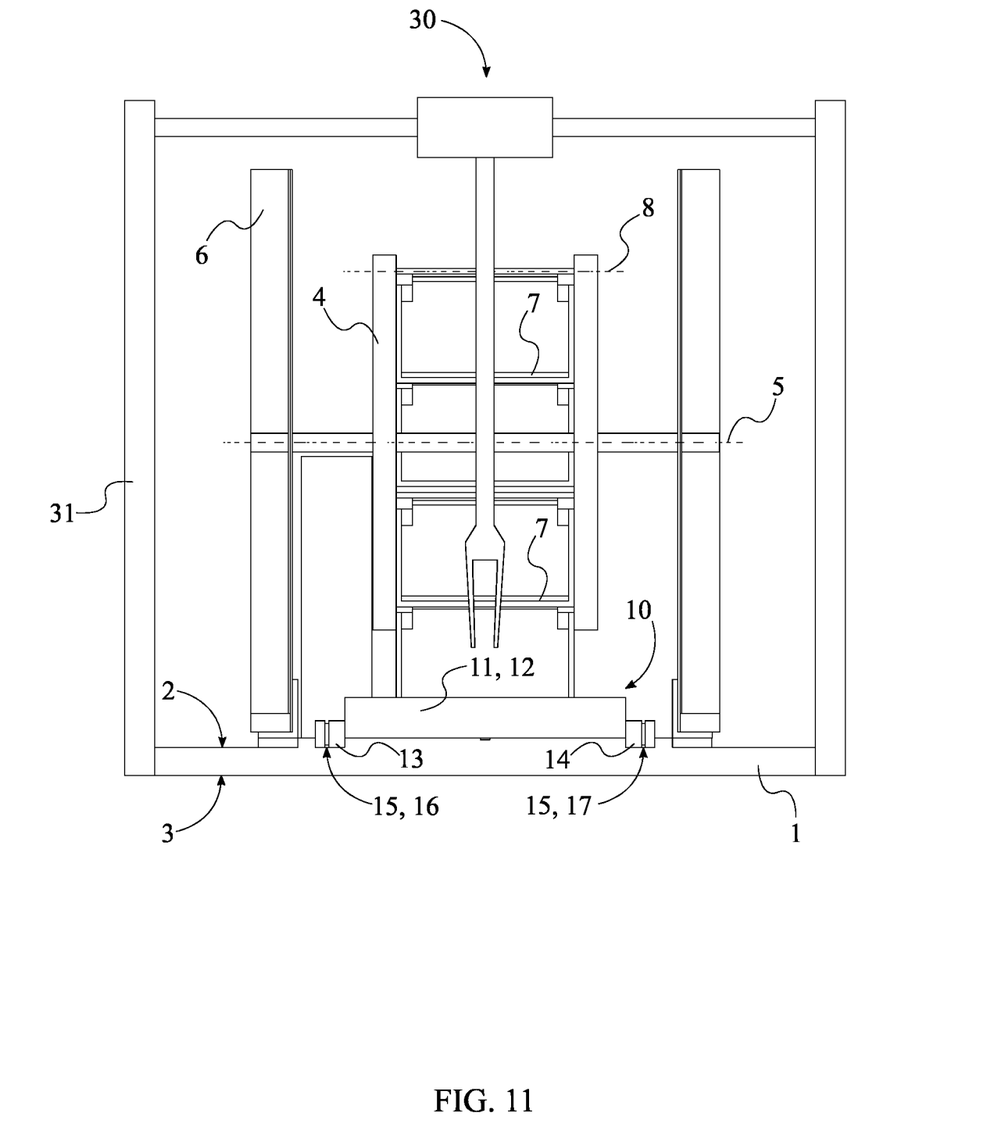
FIG. 11 is a back view of the present invention, wherein the crane system is shown mounted onto the support platform, adjacent to the outbound conveyor system.

To further facilitate the organizing and the loading of products in the loading area, the present invention may further comprise a crane system 30. As can be seen in FIG. 11, the crane system 30 enables the retrieval of a desired number of products from the conveyor shuttle 11 of the outbound conveyor system 10. The crane system 30 comprises a crane anchoring base 31 that secure the crane system 30 to the support platform 1. So, the crane anchoring base 31 is mounted onto the first platform face 2. In addition, the crane anchoring base 31 is positioned adjacent to the outbound conveyor system 10, offset from the support wheel 4. This enables the crane system 30 to retrieve the products from the conveyor shuttle 11 of the outbound conveyor system 10 and place the retrieved products in a position to be restacked according to a desired order (based on a database of information form sales). The crane system 30 also enables the system to arrange a custom order by retrieving products stored in different tubular shelves from the plurality of shelves 7. In other embodiments, the present invention can utilize different means to retrieve the products from the conveyor shuttle 11 of the outbound conveyor system 10.

In exemplary embodiment, the present invention may be installed about 40 feet from dock doors inside the warehouse or the distribution center. This provides ample space for loaders to work without limiting dock shuttle movement. The present invention may sit directly behind the dock doors and square to the dock doors, just 40 feet away from doors. At the beginning of the day, and assuming the plurality of tubular shelves 7 is empty, a stager may pick one or more orders from the scheduling system. Each order is separate, and each order may be placed by a different buyer. The stager may pick an order from the inventory and stage the product onto the conveyor shuttle 11 of the inbound conveyor system 9. The support wheel 4 is rotated to position a selected tubular shelf of the plurality of tubular shelves 7 to the bottom of the support wheel 4, adjacent to the first platform face 2. Then, the conveyor shuttle 11 of the inbound conveyor system 9 moves to a position adjacent to the selected tubular shelf of the plurality of tubular shelves 7. The order is transferred from the conveyor shuttle 11 to the selected tubular shelf. After the whole ordered is transferred, the conveyor shuttle 11 of the inbound conveyor system 9 moves to the starting position to receive the next order. The support wheel 4 may also rotate to ready another tubular shelf to receive another order. When a truck arrives to the dock area, the support wheel 4 is rotated to position the corresponding tubular shelf with the appropriate order to the bottom of the support wheel 4, adjacent to the first platform face 2. The conveyor shuttle 11 of the outbound conveyor system 10 is then moved against the tubular shelf so that the order stored in the tubular shelf is transferred to the conveyor shuttle 11. After the order has been transferred, the conveyor shuttle 11 of the outbound conveyor system 10 is moved away from the support wheel 4, closer to the dock door where the truck is parked. The order is then moved from the conveyor shuttle 11 to the truck. Overall, the present invention makes the product flow linear so that the company can take advantage of lead time.

In some embodiments, the present invention can be provided with a supply-chain management software (SCMS). Since it is difficult to keep the plurality of tubular shelves 7 full in a fast-paced environment, there is a need to expedite stacking of mixed stock keeping unit (SKU) into full pallets. The crane system 30 allows for stacking unlike SKU into full pallets to be loaded onto the corresponding truck. Each tubular shelf of the plurality of tubular shelves 7 may be loaded with like products or different products. Information from orders in the SCMS dictates initial load up of the support wheel 4. As orders come up on a user interface, an operator may pick and pull product from the outbound conveyor system 10. Multiple different SKUs may be placed on the outbound conveyor system 10 and an operator may unstack the full pallets and re-stack the products into full pallets at staging area, based on customer orders. The crane system 30 may traverse the outbound conveyor system 10, come down over the top of the conveyor shuttle 11, pick the necessary number of boxes, and place the product in the staging area. After the final pallet is built, the conveyor shuttle 11 is moved so that a forklift operator can take retrieve the final pallet. Since many products are heavy, partial pallets can come out and readied for manual build up. The SCMS facilitates operation of the present invention and may be hosted on a centralized server, such as, for example, a cloud computing service. The centralized server may communicate with other network entities, such as, for example, a mobile device (such as a smartphone, a laptop, a tablet computer, etc.), other electronic devices (such as desktop computers, server computers, etc.), databases (may be related to orders), sensors and actuators (placed on a conveyor shuttle 11) over a communication network, such as, but not limited to, the Internet. Further, users of the online platform may include relevant parties such as, but not limited to, customers, loading employees and administrators. Accordingly, in some instances, electronic devices operated by the one or more relevant parties may be in communication with the online platform. A user, such as the one or more relevant parties, may access the online platform through a web-based software application or browser. The web-based software application may be embodied as, for example, but not be limited to, a website, a web application, a desktop application, and a mobile application compatible with a computing device.

Although the invention has been explained in relation to its preferred embodiment, it is to be understood that many other possible modifications and variations can be made without departing from the spirit and scope of the invention.

What is claimed is:

1. An inventory management loadout system comprising:
a support platform;
a support wheel;
a wheel frame;
a plurality of tubular shelves;
an inbound conveyor system;
an outbound conveyor system;
the support platform comprising a first platform face and a second platform face;
the support wheel being rotatably mounted onto the first platform face by the wheel frame;

a wheel rotation axis of the support wheel being positioned parallel to the support platform;
the plurality of tubular shelves being radially distributed about the support wheel;
a sleeve central axis of each of the plurality of tubular shelves being positioned perpendicular to the wheel rotation axis;
the sleeve central axis of the each of the plurality of tubular shelves being positioned parallel to the support platform;
the inbound conveyor system and the outbound conveyor system being mounted onto the first platform face;
the inbound conveyor system, the support wheel, and the outbound conveyor system being serially positioned to each other;
the inbound conveyor system and the outbound conveyor system each comprising a conveyor shuttle and a conveyor track;
the conveyor track being positioned parallel to the support platform;
the conveyor track being mounted onto the first platform face; and
the conveyor shuttle being movably mounted along the conveyor track.

2. The inventory management loadout system as claimed in claim 1 comprising:
a controller;
a motor;
a power system;
the controller and the power system being mounted offset to the wheel frame;
the controller being electronically connected to the motor;
the power system being electrically connected to the controller and the motor; and,
the motor being operatively coupled to the support wheel, wherein the motor is used to rotate the support wheel.

3. The inventory management loadout system as claimed in claim 2 comprising:
an epicyclic gear train;
the motor being a high torque motor;
the epicyclic gear train comprising a train input and a train output;
the high torque motor being operatively coupled to the train input, wherein the high torque motor is used to rotate the train input; and,
the train output being torsionally mounted to the support wheel.

4. The inventory management loadout system as claimed in claim 2 comprising:
at least one drive roller;
the motor being a high torque motor;
the at least one drive roller being rotatably mounted into the support platform from the first platform surface;
a roller rotation axis of the at least one drive roller being positioned parallel to the wheel rotation axis;
the high torque motor being operatively coupled to the at least one drive roller, wherein the high torque motor is used to rotate the at least one drive roller; and,
the at least one drive roller being frictionally pressed against the support wheel.

5. The inventory management loadout system as claimed in claim 1 comprising: a controller; a power system; the inbound conveyor system and the outbound conveyor system each being a motorized conveyor system; the controller being communicably coupled to the motorized conveyor system; and, the power system being electrically connected to the motorized conveyor system.

6. The inventory management loadout system as claimed in claim 1 comprising: the conveyor shuttle comprising a shuttle base, a series of first rollers, and a series of second rollers; the conveyor track comprising a first track and a second track; the series of first rollers being rotatably mounted adjacent to the shuttle base; the series of second rollers being rotatably mounted adjacent to the shuttle base, opposite the series of first rollers; the first track and the second track being mounted parallel onto the first platform surface; the first track and the second track being positioned parallel and offset to each other; the series of first rollers being translationally engaged along the first track; and, the series of second rollers being translationally engaged along the second track.

7. The inventory management loadout system as claimed in claim 1 comprising: the inbound conveyor system and the outbound conveyor system each further comprising at least one organizing feature; and, the at least one organizing feature being mounted onto the conveyor shuttle.

8. The inventory management loadout system as claimed in claim 1 comprising: the inbound conveyor system and the outbound conveyor system each further comprising a shelf transfer mechanism; and, the shelf transfer mechanism being operatively mounted to the conveyor shuttle, wherein the shelf transfer mechanism of the inbound conveyor system is used to load items from the conveyor shuttle of the inbound conveyor system to a selected shelf from the plurality of tubular shelves, and wherein the shelf transfer mechanism of the outbound conveyor system is used to unload items from a selected shelf from the plurality of tubular shelves to the conveyor shuttle of the outbound conveyor system.

9. The inventory management loadout system as claimed in claim 1 comprising:
a crane system;
the crane system comprising a crane anchoring base;
the crane anchoring base being mounted onto the first platform surface; and,
the crane anchoring base being positioned adjacent to the outbound conveyor system, offset from the support wheel.

10. An inventory management loadout system comprising:
a support platform;
a support wheel;
a wheel frame;
a plurality of tubular shelves;
an inbound conveyor system;
an outbound conveyor system;
a controller;
a motor;
a power system;
a crane system;
the support platform comprising a first platform face and a second platform face;
the crane system comprising a crane anchoring base;
the support wheel being rotatably mounted onto the first platform face by the wheel frame;
a wheel rotation axis of the support wheel being positioned parallel to the support platform;
the plurality of tubular shelves being radially distributed about the support wheel;
a sleeve central axis of each of the plurality of tubular shelves being positioned perpendicular to the wheel rotation axis;
the sleeve central axis of the each of the plurality of tubular shelves being positioned parallel to the support platform;

the inbound conveyor system and the outbound conveyor system being mounted onto the first platform face;

the inbound conveyor system, the support wheel, and the outbound conveyor system being serially positioned to each other;

the controller and the power system being mounted offset to the wheel frame;

the controller being electronically connected to the motor;

the power system being electrically connected to the controller and the motor;

the motor being operatively coupled to the support wheel, wherein the motor is used to rotate the support wheel;

the crane anchoring base being mounted onto the first platform surface;

the crane anchoring base being positioned adjacent to the outbound conveyor system, offset from the support wheel;

the inbound conveyor system and the outbound conveyor system each comprising a conveyor shuttle and a conveyor track;

the conveyor track being positioned parallel to the support platform;

the conveyor track being mounted onto the first platform face; and the conveyor shuttle being movably mounted along the conveyor track.

11. The inventory management loadout system as claimed in claim 10 comprising:

an epicyclic gear train;

the motor being a high torque motor;

the epicyclic gear train comprising a train input and a train output;

the high torque motor being operatively coupled to the train input, wherein the high torque motor is used to rotate the train input; and, the train output being torsionally mounted to the support wheel.

12. The inventory management loadout system as claimed in claim 10 comprising:

at least one drive roller;

the motor being a high torque motor;

the at least one drive roller being rotatably mounted into the support platform from the first platform surface;

a roller rotation axis of the at least one drive roller being positioned parallel to the wheel rotation axis;

the high torque motor being operatively coupled to the at least one drive roller, wherein the high torque motor is used to rotate the at least one drive roller; and, the at least one drive roller being frictionally pressed against the support wheel.

13. The inventory management loadout system as claimed in claim 10 comprising: the inbound conveyor system and the outbound conveyor system each being a motorized conveyor system; the controller being communicably coupled to the motorized conveyor system; and, the power system being electrically connected to the motorized conveyor system.

14. The inventory management loadout system as claimed in claim 10 comprising: the conveyor shuttle comprising a shuttle base, a series of first rollers, and a series of second rollers; the conveyor track comprising a first track and a second track; the series of first rollers being rotatably mounted adjacent to the shuttle base; the series of second rollers being rotatably mounted adjacent to the shuttle base, opposite the series of first rollers; the first track and the second track being mounted parallel onto the first platform surface; the first track and the second track being positioned parallel and offset to each other; the series of first rollers being translationally engaged along the first track; and, the series of second rollers being translationally engaged along the second track.

15. The inventory management loadout system as claimed in claim 10 comprising: the inbound conveyor system and the outbound conveyor system each further comprising at least one organizing feature; and, the at least one organizing feature being mounted onto the conveyor shuttle.

16. The inventory management loadout system as claimed in claim 10 comprising: the inbound conveyor system and the outbound conveyor system each further comprising a shelf transfer mechanism; and, the shelf transfer mechanism being operatively mounted to the conveyor shuttle, wherein the shelf transfer mechanism of the inbound conveyor system is used to load items from the conveyor shuttle of the inbound conveyor system to a selected shelf from the plurality of tubular shelves, and wherein the shelf transfer mechanism of the outbound conveyor system is used to unload items from a selected shelf from the plurality of tubular shelves to the conveyor shuttle of the outbound conveyor system.

\* \* \* \* \*